United States Patent
Yoshimi et al.

[11] Patent Number: 5,181,654
[45] Date of Patent: Jan. 26, 1993

[54] SUNSHINE SENSOR AND AIR CONDITIONER FOR VEHICLE

[75] Inventors: Tomohisa Yoshimi, Gamagori; Shinji Iwama, Anjo; Yuuichi Kajino; Hikaru Sugi, both of Nagoya, all of Japan

[73] Assignee: Nippondenso Co., Ltd., Kariya, Japan

[21] Appl. No.: 769,804

[22] Filed: Oct. 2, 1991

[30] Foreign Application Priority Data

Oct. 4, 1990 [JP] Japan .................. 2-268066

[51] Int. Cl.$^5$ .................. G01J 1/20
[52] U.S. Cl. .................. 236/91 C; 126/573; 250/203.4
[58] Field of Search .................. 236/91 C; 250/203.4; 126/425

[56] References Cited

U.S. PATENT DOCUMENTS

| | | |
|---|---|---|
| 4,769,531 | 9/1988 | Malek .................. 126/425 |
| 4,890,460 | 1/1990 | Takari et al. .................. 126/425 |
| 5,117,744 | 6/1992 | Zimmer et al. .................. 236/91 C |

FOREIGN PATENT DOCUMENTS

| | | |
|---|---|---|
| 0043015 | 4/1981 | Japan .................. 236/91 C |
| 0082623 | 7/1981 | Japan .................. 236/91 C |
| 0025010 | 10/1981 | Japan .................. 236/91 C |
| 63-141816 | 6/1988 | Japan . |
| 1136811 | 5/1989 | Japan . |
| 1136812 | 5/1989 | Japan . |

*Primary Examiner*—A. Michael Chambers
*Attorney, Agent, or Firm*—Cushman, Darby & Cushman

[57] ABSTRACT

An air conditioner for use with a car employing a sunshine sensor having three light receiving elements. A first light receiving element faces upward and a second light receiving element and a third light receiving element are inclined toward a front side by an identical angle along an advancing direction of the car and are symmetrically inclined with respect the car advancing direction along a horizontal direction vertical to the car advancing direction. The inclination is determined such that a vector obtained by adding normal vectors respectively of light receiving surfaces of the light receiving elements has a direction substantially identical to a direction of sunshine which maximizes a quantity of heat supplied from the sunshine to the car. Outputs from the first, second, and third light receiving elements are added to each other to obtain a sunshine intensity.

11 Claims, 9 Drawing Sheets

SUNSHINE SENSOR AND AIR CONDITIONER FOR VEHICLE

BACKGROUND OF THE INVENTION

The present invention relates to a sunshine sensor and an air conditioner for a vehicle or car, and in particular, to a sunshine sensor and an air conditioner for a vehicle or car employing the sensor in which an intensity of the sunshine, an angle of elevation of the sunshine, and an angle of an azimuth of the sunshine can be sensed and which includes three light receiving elements to easily obtain the sunshine intensity as a total of outputs from these elements.

Conventionally, to cope with a remarkable change caused by a variation of a sunshine condition in the effective temperature of a user in a car, the air conditioner for the car senses states of the sunshine irradiated onto the car such as an amount of the illuminated light and an irradiation angle of sunshine so that depending on the amount of sunshine and the sunshine irradiation angle, an appropriate air blow-off exit thereof is selected to adjust a temperature of a blow-off air and a blow-off air flow rate, thereby achieving the sunshine correction control to appropriately regulate the distribution of the conditioned air in an interior room of the car. In this sunshine correction control, the operation of the air conditioner is not regulated only by the measured temperature in the car and the temperature preset by the user. Namely, there are additionally achieved control operations e.g. for an increased amount of the irradiated sunshine, the flow-off air temperature is lowered according to the amount; alternatively, an appropriate air blow-off exit of the air conditioner is selected depending on the sunshine illuminating direction to adjust the flow rate of the blow-off air.

In order to sense the sunshine states, this air conditioner employs a sunshine sensor. Sensors applicable to the conditioner have been described, for example, in the JP-A-1-136811, JP-A-1-136812, and JP-A-63-141816.

Each of the sunshine sensors respectively described in the JP-A-1-136811 and JP-A-1-136812 includes a pair of light receiving elements which are inclined with respect to a car moving or advancing direction and which are symmetrically inclined with respect to a horizontal direction vertical to the car moving direction. Using these light receiving elements, whether the sunshine is illuminated from the right or left is judged; moreover, the intensity thereof is also sensed.

In addition, according to the JP-A-63-141816, a pair of first sunshine sensors are disposed such that one of the sensors is arranged at a position in a car advancing direction (+X axis) and the other one thereof is installed at a position in a direction (−X axis) opposite thereto. More concretely, these light receiving elements are arranged along the X axis to be symmetric with respect to a direction (Y axis) vertical to the car advancing direction on a horizontal plane fixed to the car, the elements being inclined along a perpendicular direction (−Z axis). Moreover, a pair of second light receiving elements are respectively disposed at a position associated with a direction (+Y axis) toward the left with respect to the car advancing direction (+X axis) and at a position related to a direction toward the right (−Y axis) relative thereto. These light receiving elements are disposed along the Y-axis direction to be symmetric with respect to the X axis and to be inclined along the −Z axis direction.

In the sunshine sensor, the first light receiving elements are employed to detect an angle between the Z axis and a mapping result of the light beam onto the XZ plane, whereas the second light receiving elements are adopted to sense an angle between the Z axis and a mapping result of the light beam onto the YZ plane. Furthermore, the intensity of the sunshine is attained by computing the total of outputs from the four light receiving elements.

However, each of the sunshine sensors described in the JP-A-1-136811 and JP-A-1-136812 employing a pair of light receiving elements cannot detect a spatial azimuth of the light beam. Consequently, it has been impossible to correctly determine the azimuth and intensity of the illuminated light beam.

Moreover, in the sunshine sensor of the JP-A-63-141816, the light receiving surfaces of the respective light receiving elements are arranged about the Z axis to be rotationally symmetric with an angular discrepancy of 90° therebetween. The sum of normal vectors of the respective light receiving surfaces is oriented toward the upper direction of the perpendicular axis (+Z axis). In consequence, the maximum value of the measured value of the sunshine sensor is developed when the sunshine direction matches the perpendicular direction.

However, actually, due to presence of a roof of a car, the quantity of heat received by the car is not maximized even when the sunshine direction is identical to the perpendicular direction. Consequently, in the sunshine sensor of the JP-A-63-141816, when the total of the outputs from the respective light receiving elements is employed to decide the measured value of the quantity of heat received by the car, the resultant data contains a considerably large error.

In addition, although there has been implied a sunshine sensor adopting three light receiving elements, any particular considerations have not been given to the arrangement of the light receiving elements. Consequently, a characteristic of the outputs from the receiving elements is not optimized.

SUMMARY OF THE INVENTION

It is therefore an object of the present invention to measure the elevation angle, the azimuth angle of the sunshine, and the quantity of heat received by the car in a simple manner and with a high precision, thereby removing the problems above.

In accordance with the present invention, in order to substantially match the sum vector of the normal vectors respectively of the three light receiving elements with the sunshine direction associated with the maximum quantity of heat received by the car, the light receiving elements are arranged to face the respective different directions.

In consequence, the total of outputs from the respective light receiving elements and the quantity of heat received by the car develop an identical characteristic with respect to the sunshine direction.

This sunshine sensor has an object to correctly measure the quantity of heat received by the car based on the total of the outputs from the respective light receiving elements.

Another object of the present sunshine sensor is to appropriately detect the intensity, elevation angle, and azimuth angle of the sunshine depending on the outputs from the respective light receiving elements.

In addressing the above problems, the configuration according to the present invention includes a first light receiving element having a light receiving surface facing upward and a second light receiving element and a third light receiving element which each have a light receiving surface inclined toward a front side by an identical angle along a car advancing direction, the light receiving surfaces being symmetrically inclined with respect the car advancing direction along a horizontal direction vertical to the car advancing direction, and adder means for adding to each other outputs respectively produced from said light receiving elements. In this constitution, each of the light receiving surfaces respectively of the second and third light receiving elements has a inclination angle such that a vector obtained by adding normal vectors respectively of the light receiving surfaces of the respective light receiving elements has a direction substantially identical to a direction of sunshine which maximizes a quantity of heat supplied from the sunshine to the car.

Furthermore, the sunshine sensor according to the present invention includes a first light receiving element facing upward and producing an output ic, a second light receiving element generating an output ia and a third light receiving element creating an output ib, the second and third light receiving elements being inclined toward a front side by an identical angle along a car advancing direction and being symmetrically inclined with respect the car advancing direction along a horizontal direction vertical to the car advancing direction, and computating means for computing based on the outputs respectively from the first, second, and third light receiving elements a sunshine intensity I, a sunshine elevation angle $\theta$, and a sunshine azimuth angle $\phi$, the computing means computing the sunshine intensity I, the sunshine elevation angle $\theta$, and the sunshine azimuth angle $\phi$ by use of the following equations.

$$\theta = \cos^{-1}\sqrt{\frac{(ia - ib)^2 + (ia + ib - 1.07ic)^2}{1.426ic^2 + (ia - ib)^2 + (ia + ib - 1.07ic)^2}}$$

$$I = ic/\sin\theta$$

$$\phi = \cos^{-1}\left(\frac{ia + ib - 1.07ic}{1.194ic \cdot \cos\theta/\sin\theta}\right)$$

The air conditioner for use with a car according to the present invention comprises a sunshine sensor including a first light receiving element facing upward, a second light receiving element and a third light receiving element which each are inclined toward a front side by an identical angle along a car advancing direction and which are symmetrically inclined with respect the car advancing direction along a horizontal direction vertical to the car advancing direction wherein each of the second and third light receiving elements has a light receiving surface possessing an inclination angle such that a vector obtained by adding normal vectors respectively of the light receiving surfaces of the respective light receiving elements has a direction substantially identical to a direction of sunshine which maximizes a quantity of heat supplied from the sunshine to the car, air conditioning means for regulating a temperature and an amount of air to be supplied to an interior room of the car, and a control means for computing sunshine components from outputs respectively created from the first, second, and third light receiving elements and controlling the air conditioning means based on a result of the computation.

In addition, the method of controlling the air conditioner for a car according to the present invention includes a step of obtaining an output ic generated from a first light receiving element facing upward, an output ia produced from a second light receiving element, and an output ib generated from a third light receiving element, each of the second and third light receiving elements being inclined toward a front side by an identical angle along a car advancing direction, the second a third light receiving elements being symmetrically inclined with respect a car advancing direction along a horizontal direction vertical to the car advancing direction, a step of computing based on the outputs respectively from the first, second, and third light receiving elements a sunshine intensity I, a sunshine elevation angle $\theta$, and a sunshine azimuth angle $\phi$ from the following equations, $$\theta = \cos^{-1}\sqrt{\frac{(ia - ib)^2 + (ia + ib - 1.07ic)^2}{1.426ic^2 + (ia - ib)^2 + (ia + ib - 1.07ic)^2}}$$

$$I = ic/\sin\theta$$

$$\phi = \cos^{-1}\left(\frac{ia + ib - 1.07ic}{1.194ic \cdot \cos\theta/\sin\theta}\right)$$

a step of computing a control target value of the air conditioner based on the computed values respectively of the sunshine intensity I, the sunshine elevation angle $\theta$, and the sunshine azimuth angle $\phi$, and a step of controlling the air conditioner depending on the control target value.

In the sunshine sensor according to the present invention, the light receiving surfaces respectively of the three light receiving elements are oriented in the different directions, respectively. Particularly, the light receiving elements are arranged such that a sum of the normal vectors of the associated light receiving surfaces has a direction substantially identical to a sunshine direction in which a quantity of heat received by the car develops a maximum value.

In consequence, the total of outputs respectively created from the light receiving elements takes a maximum value when the sunshine direction matches the direction of the vector obtained as the total of the normal vectors.

As a result, in this sunshine sensor, the total of the outputs of the respective light receiving elements and the quantity of heat received by the car can develop an identical characteristic with respect to the sunshine direction.

Consequently, the sunshine sensor can correctly measure the heat reception quantity of the car based on the total of the outputs respectively produced from the light receiving elements.

BRIEF DESCRIPTION OF THE DRAWINGS

These and other objects and advantages of the invention will become apparent by reference to the following description and accompanying drawings wherein.

DESCRIPTION OF THE PREFERRED EMBODIMENTS

Figure 1C:
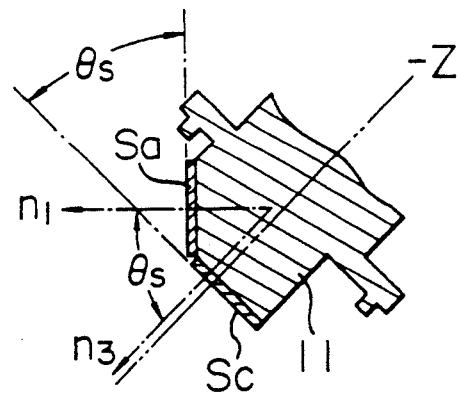
FIGS. 1A, 1B, and 1C are diagrams showing the structure of a sunshine sensor in a specific embodiment according to the present invention.

Referring now to the drawings, a description will be given of specific embodiments according to the present invention.

Figure 2:
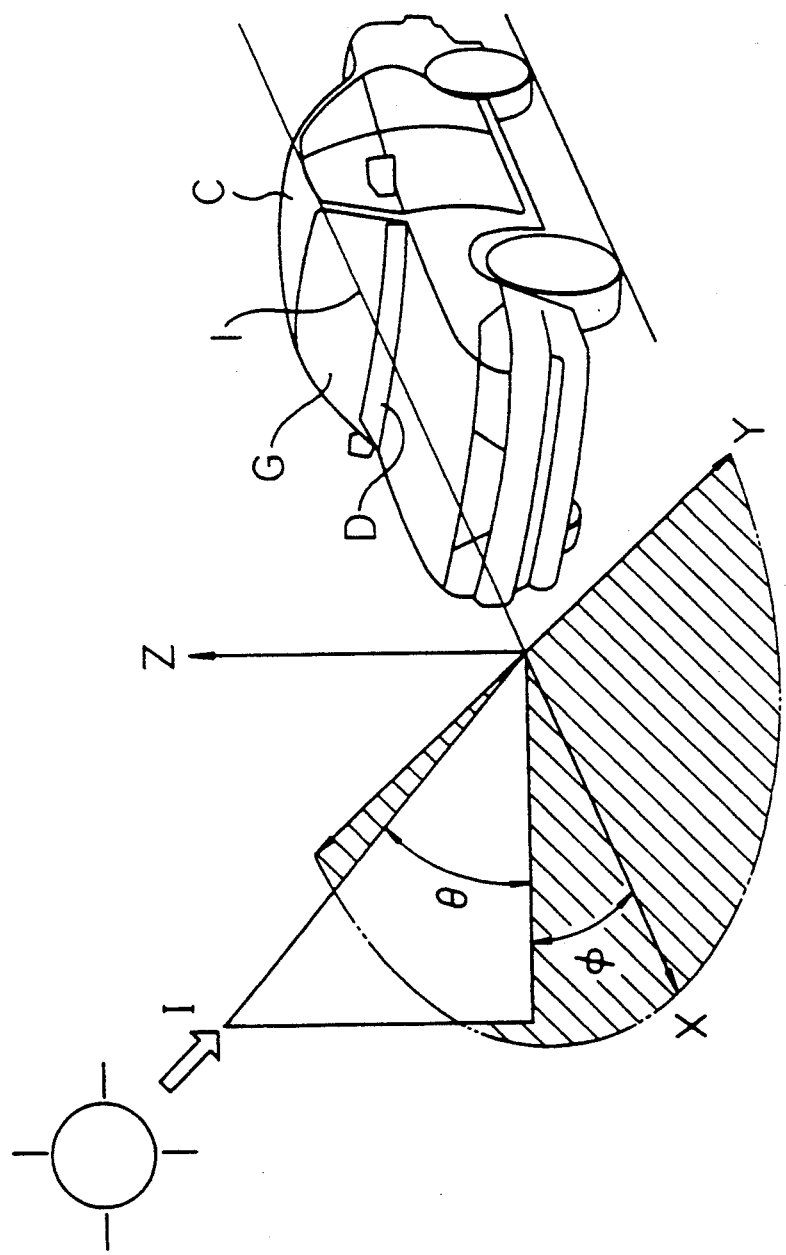
FIG. 2 is an explanatory diagram for explaining relationships of coordinates between a sunshine sensor and a car.

As shown in FIG. 2, a sunshine sensor including light receiving elements and a hemispherical cover is arranged on a dashboard D beneath an inner surface of a windshield G of a car C.

Let us assume here the car C is considered to be in the following coordinate system.

A direction in which the car C advances is related to an X axis (+X axis corresponds to the advancing direction), a direction which is vertical to the car advancing direction on a horizontal plane fixed to the car C is associated with Y axis (+Y axis is related to the left-hand side of the car advancing direction), and a perpendicular direction is designated by use of a Z axis (+Z axis corresponds to the upward direction).

An angle between a mapping result of the sunshine onto the XY plane and the +X axis is defined as an azimuth angle $\phi$, an angle between the sunshine beam and the XY plane is defined to be an elevation angle $\theta$, and the sunshine intensity (relative value) is expressed as I.

Figure 1A:
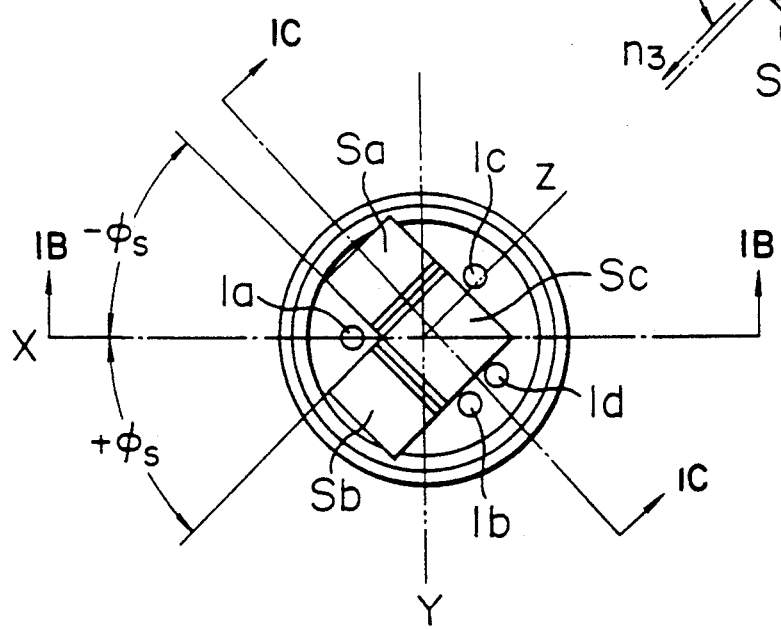
Figure 1B:
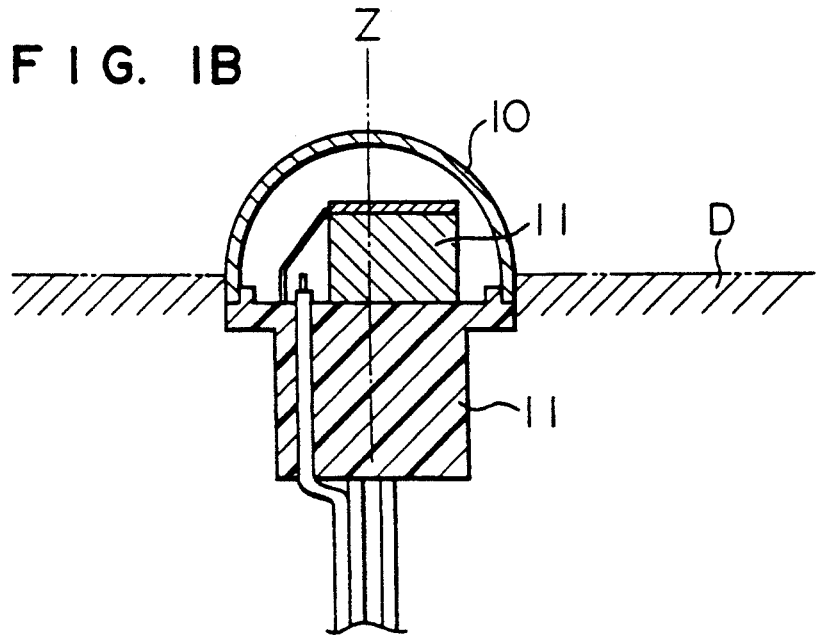

FIGS. 1A to 1C are diagrams showing the structure of a sunshine sensor 1 in an embodiment according to the present invention.

Referring now to FIGS. 1A to 1C, the structure of the sunshine sensor 1 will be described. FIG. 1A is a plan view of an internal configuration viewed from the +Z axis direction, FIG. 1B is a cross-sectional view taken along a plane perpendicular to the +Y axis, and FIG. 1C is a cross-sectional view of the primary portion of the sensor 1 rotated from the +X axis direction to +Y axis direction by 45°.

This configuration includes three light receiving elements Sa, Sb, and Sc for which there are respectively employed solar batteries each having an identical light receiving area and an identical sunshine sensitivity characteristic.

The light receiving element Sa is mounted on a surface of a base plate 11, the surface being at a rotary location relative to the +X axis i.e. apart from the +X axis toward the right (−Y axis direction) by a rotation angle $\phi_s$ and being inclined toward the front side or being rotated about the center of the sensor 1 by an angle $\theta_s$ (relative to the horizontal plane).

Moreover, the light receiving element Sb is similarly installed on a surface of a base plate 11, the surface being at a rotary position relative to the +X axis i.e. apart from the +X axis toward the left by a rotation angle $\phi_s$ and being inclined toward the front side or being rotated about the center of the sensor by an angle $\theta_s$.

On the other hand, the light receiving element Sc is disposed on a surface of the base plate 11, the surface being vertical to the Z axis.

Assuming here the light receiving surfaces respectively of the light receiving elements Sa, Sb, and Sc respectively have unit normal vectors $n_1$, $n_2$, and $n_3$, these vectors are expressed with components thereof as follows.

$$n_1 = (\cos\phi_s \sin\theta_s, -\sin\phi_s \sin\theta_s, \cos\theta_s) \tag{1}$$

$$n_2 = (\cos\phi_s \sin\theta_s, -\sin\phi_s \sin\theta_s, \cos\theta_s) \tag{2}$$

$$n_3 = (0,0,1) \tag{3}$$

In consequence, the sum $n_0$ of the normal vectors is represented as follows.

$$n_0 = (2\cos\phi_s \sin\theta_s, 0, 2\cos\theta_s + 1) \tag{4}$$

The angles $\phi_s$ and $\theta_s$ are then established in such a manner that the resultant vector $n_0$ has a direction matching that of the sunshine which maximizes the quantity of heat received by the car.

Let us assume, for example, the azimuth and elevation angles of the sunshine are respectively 0° and 60° for the maximum quantity of heat received by the car. Under this condition, a unit vector L in the sunshine direction is expressed as $$L = (1/2, 0, \sqrt{3}/2) \tag{5}$$

Consequently, the inclination angles $\phi_s$ and $\theta_s$ of the light receiving elements Sa and Sb can be obtained by solving the following equation.

$$n_0 = kL \tag{6}$$

In this situation, there exist a plurality of combinations of the inclination angles $\phi_s$ and $\theta_s$ because the degree of freedom is greater only by one for the unknown variables $\phi_s$, $\theta_s$, and k.

Let us first assume $\phi_s = 45°$ to attain the inclination angle $\theta_s$.

The optimal value is determined as $\theta_s = 57.66°$.

In this connection, for $\phi_s = 0°$ and 30°, there are obtained $\theta_s = 44.47°$ and 49.79°, respectively.

It is assumed that the sunshine sensor 1 is installed in the car such that bottom end surfaces respectively of the light receiving elements Sa and Sb and a bottom portion of the semisphere of the cove 10 are not below a plane of an upper portion of the dashboard D.

The cover 10 is manufactured in a semispherical contour with a transparent material (polycarbonate resin in this embodiment) which passes therethrough a light having a wavelength not less than a predetermined wavelength (about 700 nm in this embodiment). The cover 10 has hard-coated surfaces and hence has an appearance of a black hemisphere, namely, the inside thereof is invisible from the outside. The base plate 11 is employed to attach thereonto the light receiving elements Sa to Sc and the cover 10.

Figure 6:
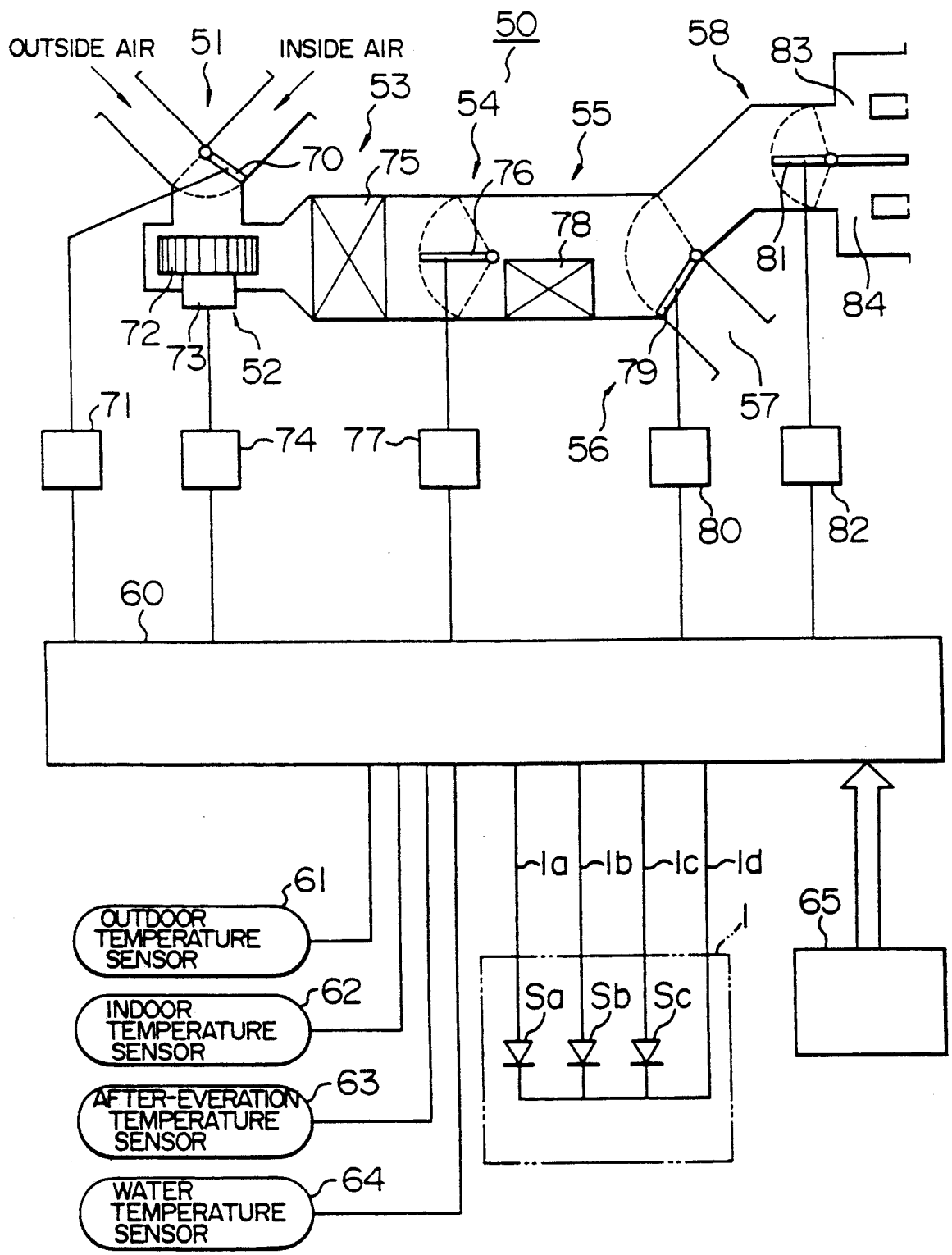
FIG. 6 is a schematic diagram showing the configuration of an air conditioner employing the sunshine sensor of the embodiment.

Moreover, the configuration includes wire harnesses 1a, 1b, 1c, and 1d for supplying the signals respectively generated from the light receiving elements Sa to Sc to an air conditioner controller 60 through a circuit connection shown in FIG. 6.

Let us assume here that the light receiving elements Sa to Sc disposed as shown in FIG. 1A respectively produce output currents ia, ib, and ic. These outputs are then represented by the following expressions (7) to (9), respectively.

$$ia = I \cdot 0.535\{\sin\theta + 1.116\cos\theta(\cos\phi + \sin\phi)\} \quad (7)$$

$$ib = I \cdot 0.535\{\sin\theta + 1.116\cos\theta(\cos\phi - \sin\phi)\} \quad (8)$$

$$ic = I \cdot \sin\theta \quad (9)$$

Figure 3:
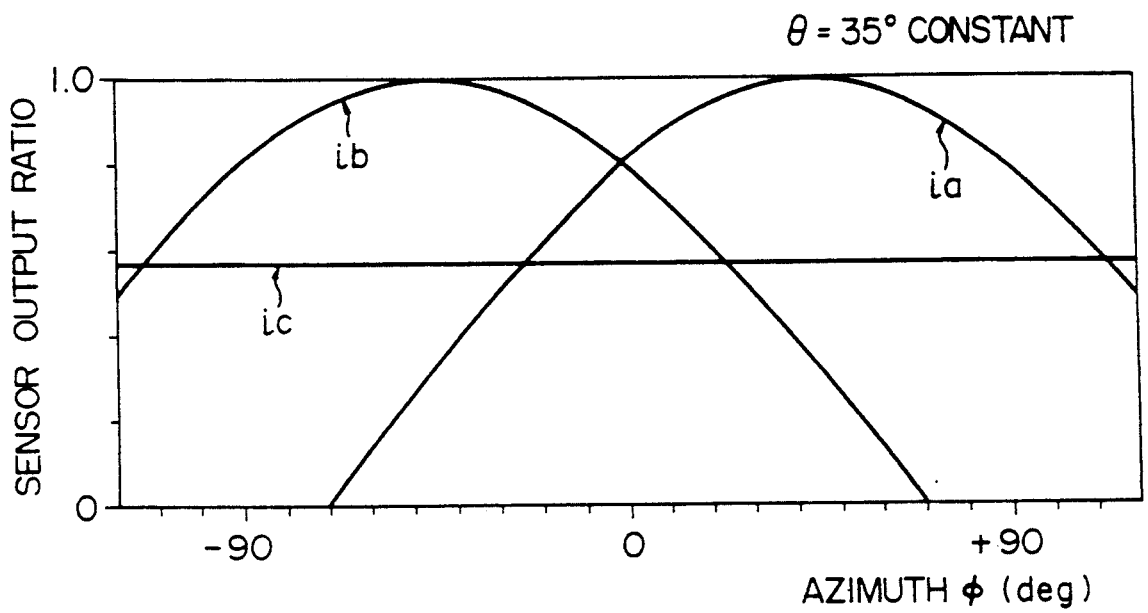
FIG. 3 is a graph showing a characteristic of relationships between output ratios of light receiving elements and the sunshine azimuth angle.
Figure 4:
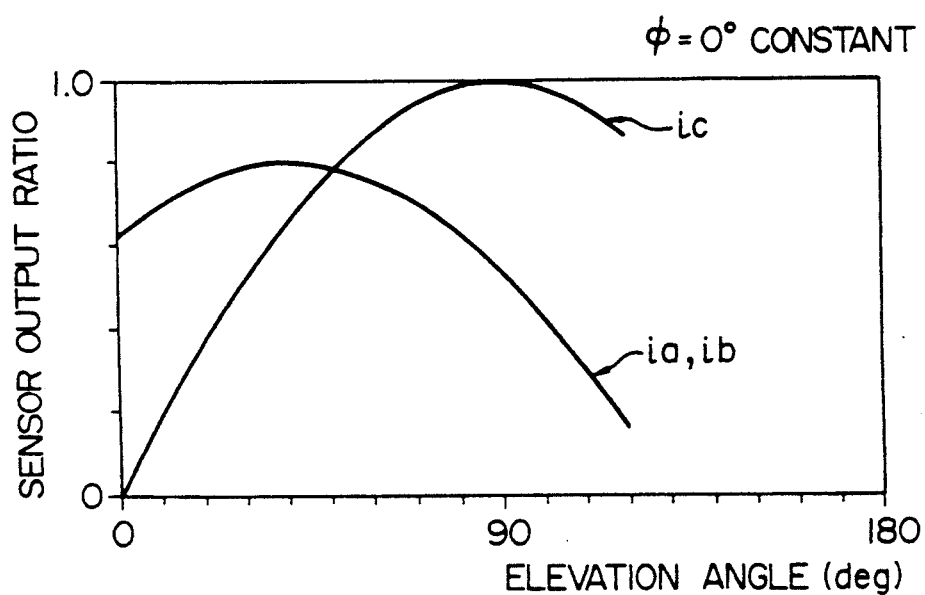
FIG. 4 is a graph showing a characteristic of relationships between output ratios of light receiving elements and the sunshine elevation angle.

FIGS. 3 and 4 show characteristics of the output currents (7) to (9) developed under preset limitative conditions. FIG. 3 shows an azimuth angle characteristic of the outputs in a situation where the sunshine azimuth angle $\phi$ is altered with the sunshine intensity I and the sunshine elevation angle $\theta$ kept unchanged. In this regard, the ordinate represents values normalized in such a manner for each light receiving element that the value obtained when the sunshine is vertical to the light receiving surface is assumed to be one.

FIG. 4 shows an elevation angle characteristic of the output currents under a condition where the sunshine elevation angle $\theta$ is changed with the sunshine intensity I and the sunshine azimuth angle $\phi$ kept retained. As can be seen from FIGS. 3 and 4, three unknown values including the sunshine intensity (relative value) I, the sunshine elevation angle $\theta$, and the sunshine azimuth angle $\phi$ can be obtained by solving the equations below.

$$\theta = \cos^{-1}\sqrt{\frac{(ia - ib)^2 + (ia + ib - 1.07ic)^2}{1.426ic^2 + (ia - ib)^2 + (ia + ib - 1.07ic)^2}} \quad (10)$$

$$I = ic/\sin\theta \quad (11)$$

$$\phi = \cos^{-1}\left(\frac{ia + ib - 1.07ic}{1.194ic \cdot \cos\theta/\sin\theta}\right) \quad (12)$$

However, depending on the sunshine angle, the region in which the sunshine components can be correctly obtained from the equations (10) to (12) based on the outputs from the three light receiving elements is limited. That is, in a case where either one of the outputs from the three light receiving elements is fixed to zero, for example, in a case associated with FIG. 3 where the azimuth angle is beyond a range from $-70°$ to $70°$ (i.e. in a region where the output ia is fixed to zero when the azimuth angle is not more than $-70°$ or in a region where the output ib is fixed to zero when the azimuth angle is not less than $+70°$), when the sunshine components are computed from the equations above, the resultant values each contain a large error.

Incidentally, this is also the case when the sunshine is scattered under a climatic condition and a weak output from the light receiving element is substantially fixed with respect to the sunshine angle.

Consequently, it is required to prevent an occurrence of a wrong operation of the air conditioner due to the measurement error related to the sunshine intensity and angle. For this purpose, namely, the sunshine angle computation zone is classified into a computable range and an incomputable range so as to employ different methods of computing the sunshine components depending on the computable and incomputable ranges, respectively. As described in association with FIG. 3, a phenomenon in which either one of the outputs from the light receiving elements is fixed to zero may easily take place in the light receiving elements Sa and Sb arranged with an inclination on the base plate 11. Accordingly, in this embodiment, the computable and incomputable ranges are discriminated depending on the output ratio between the light receiving elements Sa and Sb.

In other words, the output ratio between the light receiving elements Sa and Sb is first attained to compare the resultant value with a ratio value Th3 preset as a value for which the sunshine components cannot be easily obtained, thereby changing the method of computing the sunshine components based on the comparison result.

Figure 5:
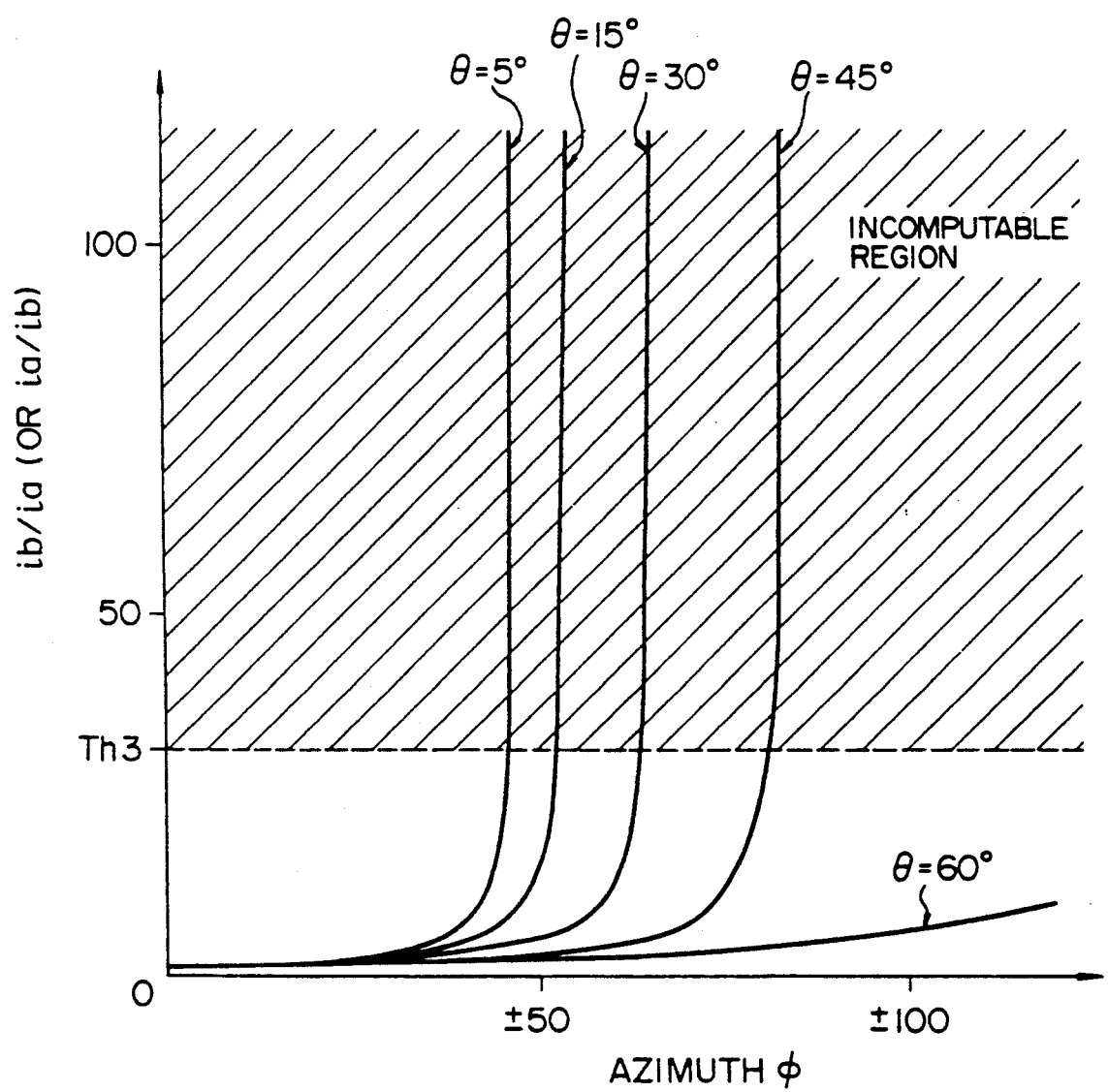
FIG. 5 is a graph showing a characteristic of relationships between output ratios of light receiving elements and an area in which the sunshine elements cannot be computed.

It is known from the expressions (7) and (8) that the output ratio (ia/ib or ib/ia) between the light receiving elements Sa and Sb is independent of the sunshine intensity I and is expressed as a function of the sunshine elevation angle $\theta$ and the sunshine azimuth angle $\phi$. FIG. 5 is a graph showing relationships therebetween.

FIG. 5 presents relationships between the sunshine elevation angle $\theta$ and the sunshine azimuth angle $\phi$ wherein the ordinate represents the output ratio obtained by dividing a smaller one of the outputs from the light receiving elements Sa and Sb by a larger one thereof based on a comparison between the outputs and the abscissa stands for the sunshine azimuth angle $\phi$.

In this embodiment, when the output ratio exceeds 100, the system assumes a sunshine component incomputable region. In a case where the output ratio is not more than 100, a comparison value Th3 is set such that when the value Th3 is exceeded by the output ratio, the ratio is considered to be related with a sunshine component incomputable region. A method of computing the sunshine components after the judgement will be described later.

FIG. 6 is a block diagram showing the constitution of an automobile air conditioner to which the sunshine sensor 1 is applied according to the present invention.

The constitution includes an air conditioner unit 50 comprising an inner/outer air change-over unit 51, a blower 52, a cooler unit 53, an air mixer unit 54, a heater unit 55, a blow-off exit change-over unit 56, a heated air blow-off exit 57, and a ventilation air blow-off exit change-over unit 58.

The inner/outer air change-over unit 51 includes an inner/outer air change-over damper 70, which is driven by a servomotor 71.

The blower 52 comprises a fan 72 and a motor 73 rotating at a rotation speed regulated by a motor driver circuit 74.

The cooler unit 53 includes an evaporator 75 of a refrigerating cycle, not shown, to be driven by an engine of the car.

The air mixer unit 54 comprises an air mixer damper 76, which is driven by a servomotor 77.

The heater unit 55 includes a heater core 78 receiving heat from the cooling water of the engine of the car.

The blow-off exit change-over unit 56 comprises a blow-off exit change-over damper 79 driven by a servomotor 80. The heated air blow-off exit 57 is oriented toward a floor of the interior room of the car.

The ventilation air blow-off exit change-over unit 58 has a ventilation air blow-off exit change-over damper 81, which is driven by a servomotor 82 to vary the ratio between the air blow-off quantities respectively of the ventilation exit on the driver side 83 and the ventilation exit on the assistant driver side 84.

The system also includes a controller 60 having an micro computer integrated therein. The controller 60 develops functions, for example, a function to add to each other outputs from the respective light receiving elements so as to compute the sunshine intensity. The processing procedure of the controller 60 will be described later. The controller 60 receives as inputs thereto signals from the sunshine sensor 1 according to the present invention, an outer temperature sensor 61, an indoor temperature sensor 62, an after-evaporation temperature sensor 63, a water temperature sensor 64, auto switches, switches employed to manually set various modes, and a switch panel 65 having a temperature setting unit.

Figure 7:
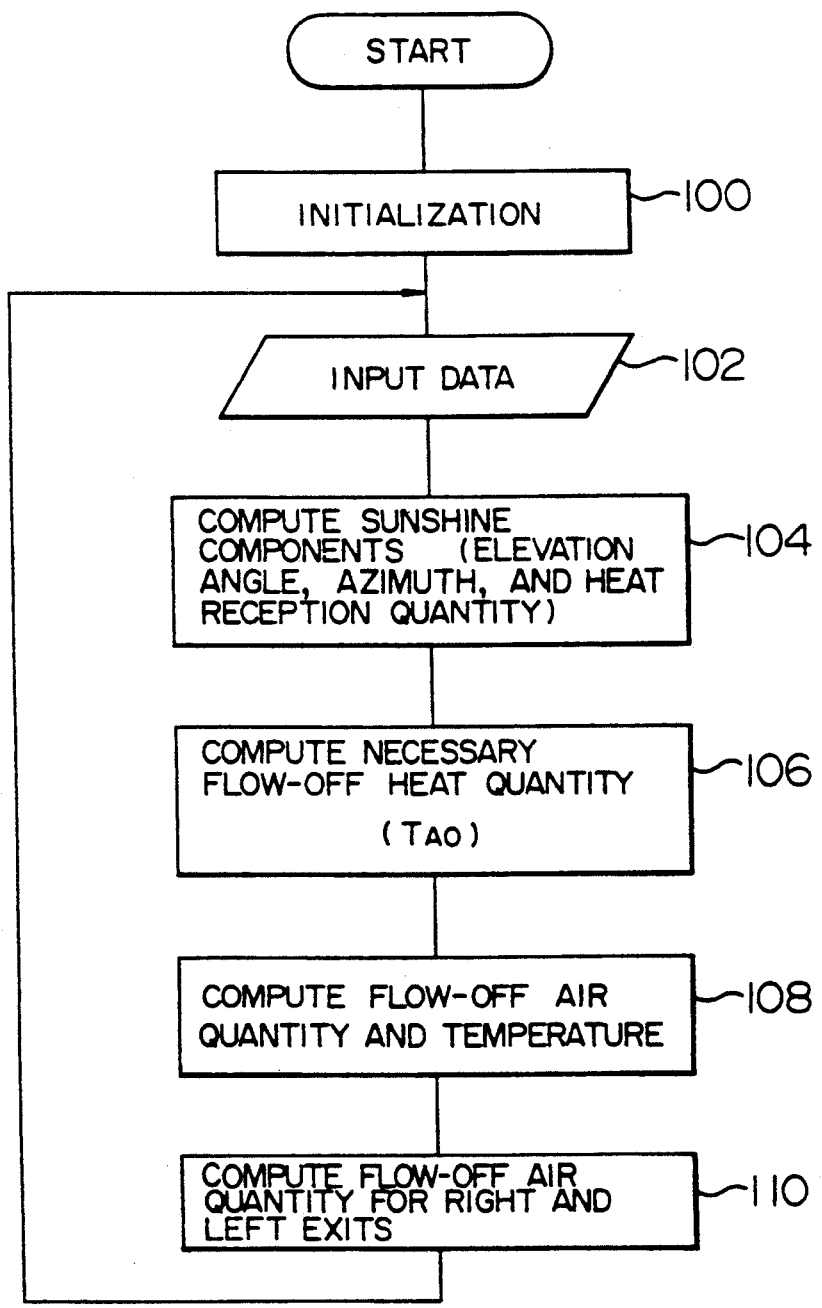
FIG. 7 is a flowchart showing the processing procedure of a computer adopted in a controller of the air conditioner of the embodiment.

Subsequently, the operation of the controller 60 will be described with reference to the flowchart of FIG. 7 showing the processing procedure of the micro computer.

In a step 100, various data items are initialized and then processing steps 102 to 110 are repeatedly executed to control the air conditioner unit 50.

In a step 102, various signals are inputted from the sunshine sensor 1, the sensors 61 to 64, and the switch panel 65.

A step 104 computes, based on the output signals respectively received from the light receiving elements of the sunshine sensor 1, the sunshine components including an elevation angle, an azimuth angle, and a light reception quantity or a sunshine intensity. The computation procedures will be described later.

Next, a step 106 computes a blow-off temperature $T_{AO}$ necessary for air-conditioning the interior room of the car by assigning the light reception quantity Ts computed in the step 104 to the expression (13) as follows.

$$T_{AO}=K_{set}T_{set}-K_rT_r-K_{am}\cdot T_{am}-K_S\cdot T_S+C \quad (13)$$

where, Kset, Kr, Kam, Ks, and C stand for constants.

In a step 108, based on the necessary blow-off temperature $T_{AO}$ and the after-evaporation temperature, the system controls the blower 52, the air mixer unit 54, and the blow-off exit change-over unit 56.

Subsequently, in a step 110, depending on the sunshine elevation angle $\theta$ and the sunshine azimuth angle $\phi$ computed in the step 104, a blow-off air quantity ratio between the right and left ventilation blow-off exit is linearly controlled by the ventilation air blow-off exit change-over damper 81.

In this connection, moreover, it is favorable to control the blow-off exit change-over damper 79 based on the sunshine elevation angle $\theta$ and the sunshine azimuth angle $\phi$ to vary the blow-off exit flow quantity ratio between the heated air blow-off exit 57 and the ventilation air blow-off exits 83 and 84.

Figure 9:
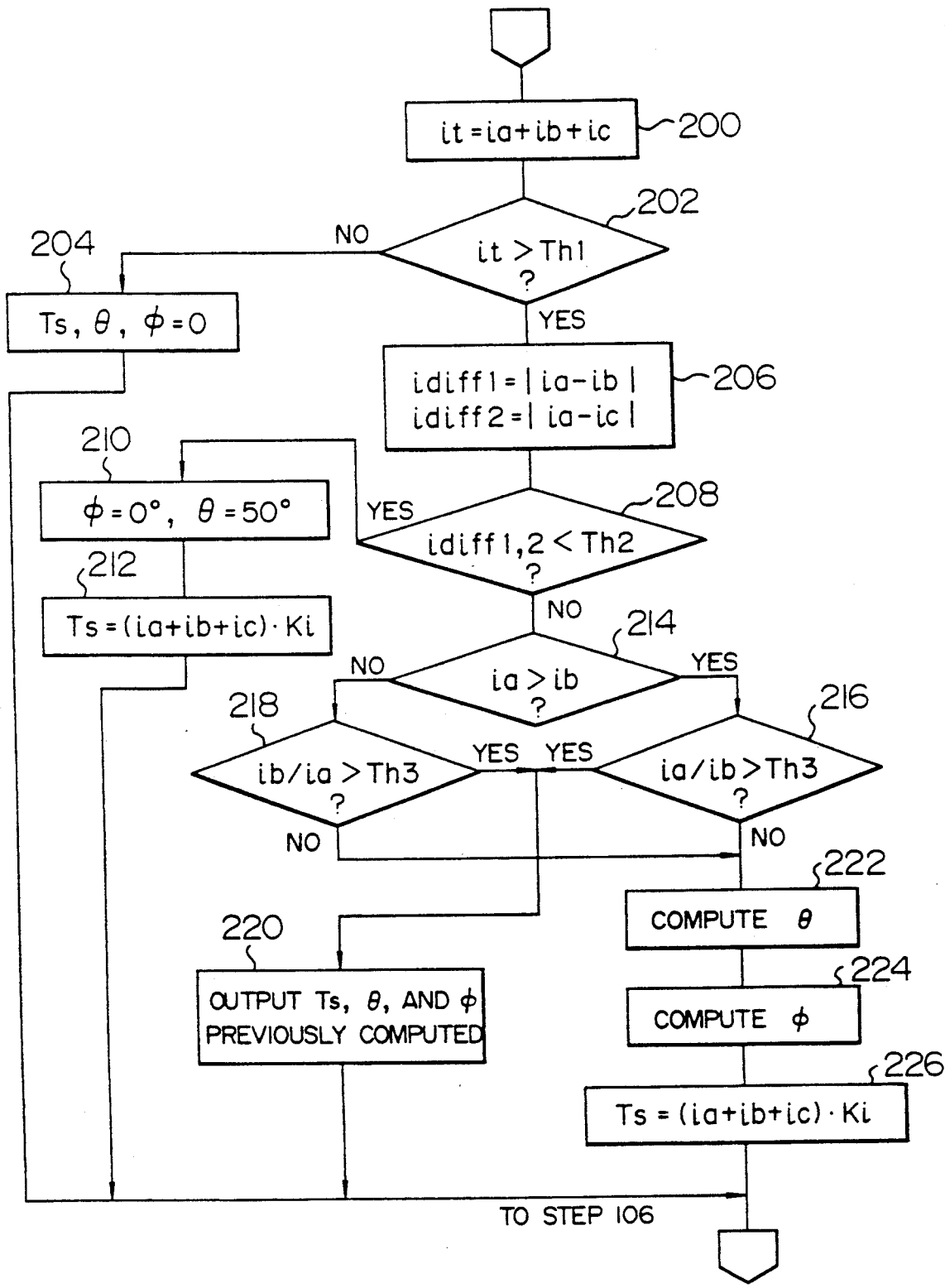
FIG. 9 shows a flowchart showing the processing procedure achieved by the computer to attain the sunshine components and the light reception quantity.
Figure 10:
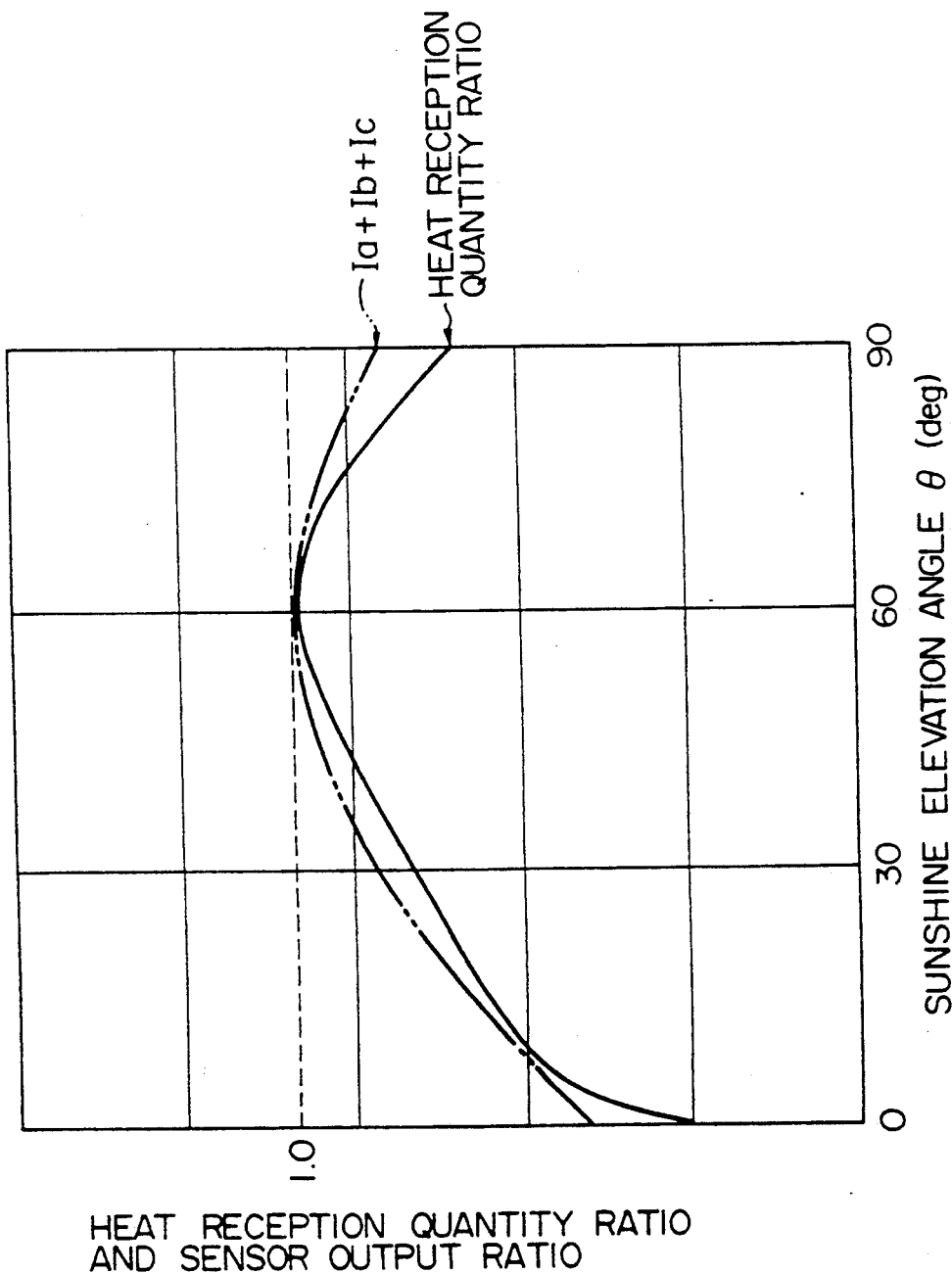
FIG. 10 is a graph showing a characteristic of the total of the outputs from the respective light receiving elements with respect to the sunshine elevation angle.

Referring next to FIGS. 9 and 10, a description will be given of a detailed procedure of the computation of the heat reception quantity Ts in the step 104.

First, in a step 200, three outputs respectively received from the three light receiving elements of the sunshine sensor 1 are added to each other. A result of the addition has a characteristic quite similar to the characteristic of the quantity of heat received by the car as shown in FIG. 10. This characteristic is obtained, as already described, in the configuration including the light receiving elements arranged as shown in FIG. 1. Since the sum of the normal vectors of the respective light receiving elements is oriented toward the sunshine direction which maximizes the quantity of heat received by the car, the characteristic with respect to the elevation angle of the total of the outputs from the light receiving elements matches that of the heat reception quantity.

Subsequently, a step 202 judges to determine whether or not a correction based on the heat reception quantity is necessary in the control of the air conditioner. That is, in a case e.g in a rainy day, where the heat reception quantity is considerably decreased, the correction above is unnecessitated in the control of the air conditioner. The judgement is conducted in the step 202 i.e. the result it of the addition of the outputs from the respective light receiving elements is compared with a preset first comparison value Th1.

If the addition result it is here smaller than the first comparison value Th1, the heat reception quantity is considered to take a small value and hence the correction is judged to be unnecessary. Thereafter, in a step 204, the heat reception quantity Ts, the elevation angle $\theta$, the sunshine azimuth angle $\phi$, and the sunshine intensity I are respectively set to initial values not undergone the correction with the light reception quantity, thereby passing control to a step 106.

On the other hand, if the addition result it is greater than the first comparison value Th1, control is transferred to a step 206.

The step 206 computes output differences idiff1 ($|ia-ib|$) and idiff2 ($|ia-ic|$) between the light receiving elements of the sunshine sensor 1. In a case where this processing step is required, the heat reception quantity of the car has a magnitude necessitating a correction. This situation occurs is such a climatic condition like in a cloudy day where there exist few direct sunshine beams i.e. most portions of the sunshine illuminated onto the car are occupied by the scattered beams. In this case, since the sunshine is considered to be uniformly incident to the interior room from all possible directions, when the expressions (10) to (12) are adopted to compute the sunshine components such as the elevation angle $\theta$ and the azimuth angle $\phi$, there appear errors in the resultant values. In this situation, the outputs from the light receiving elements are represented by approximated values. Thereafter, a step 208 judges to determine whether or not each of the output differences idiff1 and idiff2 is smaller than a preset second comparison value Th2. If this is the case, namely, if the scattered beams occupy most portions of the sunshine, control is passed to a step 210 followed by a step 212.

The step 210 sets the sunshine azimuth angle $\phi=0°$ and the sunshine elevation angle $\theta=50°$.

In this regard, although the elevation angle may be preset to 0°, since the three light receiving elements produce substantially an identical output under the condition of $\phi=0°$ and $\theta=50°$ when most portions of the sunshine illuminated onto the car are direct sunshine beams other than the scattered beams, the sunshine azimuth angle and the sunshine elevation angle are set to these values in the step 210.

Subsequently, the step 212 computes the heat reception quantity Ts based on the following equation and then transfers control to the step 106.

$$Ts = (ia + ib + ic) \times Ki \quad (14)$$

where, Ki denotes a constant employed to convert the addition resultant value into the quantity of heat received by the car.

In this connection, the heat reception quantity is obtained from the expression (14) because the light receiving surfaces respectively of the light receiving elements are arranged in such a manner, as described above, that the sum of the normal vectors of the light receiving surfaces is oriented toward the sunshine direction which maximizes the heat reception quantity.

On the other hand, in the step 208, if either one of the output differences idiff1 and idiff2 is larger than the second comparison value Th2, control is passed to a step 214. Steps 214 to 218 constitute processing to detect the sunshine angle incomputable region described in conjunction with FIG. 5. First, the step 214 compares a magnitude of the output signal from the light receiving element Sa with a magnitude of that produced from the light receiving element Sb. When the value ia is larger than the value ib, the step 216 judges to decide whether or not the value ia/ib exceeds the third comparison value Th3 described above. If this is the case (associated with the incomputable range), control is transferred to a step 220; otherwise (related to the computable range), the processing proceeds to a step 222.

On the other hand, for a condition of ia<ib, the step 218 judges to decide whether or not the value ib/ia exceeds the third comparison value Th3. If this is the case (associated with the incomputable range), control is transferred to the step 220; otherwise (related to the computable range), the processing proceeds to a step 222.

In addition, the step 220 uses as the current data the previously computed heat reception quantity Ts, elevation angle $\theta$, and azimuth angle $\phi$. Namely, the sunshine component computations using the expressions (10) to (12) are not achieved.

On the other hand, when the computable range is assumed, the step 222 computes the sunshine elevation angle $\theta$ from the expression (10), a step 224 attains the sunshine azimuth angle $\phi$ based on the expression (12), and like the step 226, a step 226 achieves a computation of the expression (14) to obtain the heat reception quantity Ts from the total of the outputs from the respective light receiving elements.

Figure 8:
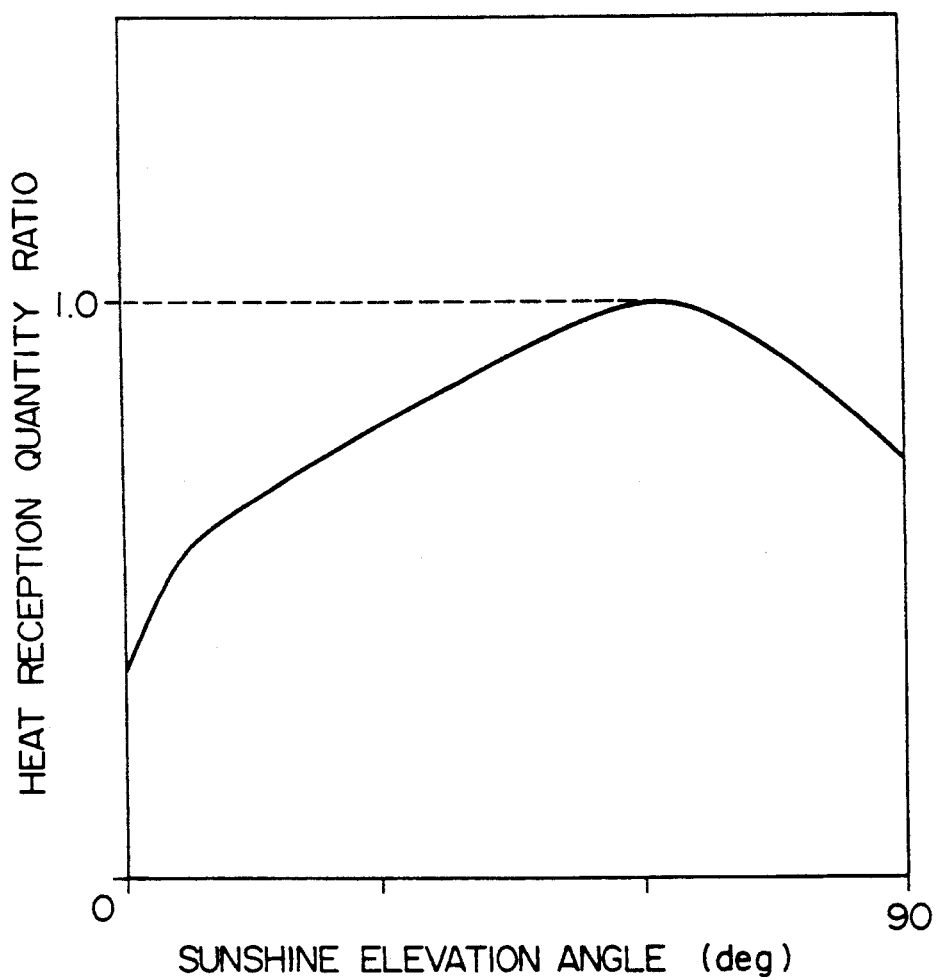
FIG. 8 is a graph showing a characteristic of the quantity of heat received by a car with respect to the sunshine elevation angle.

In this regard, when computing the heat reception quantity Ts, the step 226 may employ the expression (11), in place of the expression (14), to attain the sunshine intensity I so as to determine the heat reception quantity based on the characteristic thereof with respect to the elevation angle shown in FIG. 8. The quantity of heat received by the car depends on a contour thereof. Consequently, when a characteristic of the heat reception ratio with respect to the sunshine elevation angle as shown in FIG. 8 is memorized in advance, it is possible to obtain a heat reception quantity ratio for a measured elevation angle through an interpolation on the characteristic curve. Incidentally, the graph of FIG. 8 is drawn with values normalized by setting the maximum heat reception value to one. Moreover, when a sunshine of a certain sunshine intensity is incident to the car (the interior room thereof), the sunshine projection area onto the windshield glass surface and the like vary depending on the elevation angle and/or the azimuth angle even for an identical sunshine intensity, which hence changes the heat reception quantity of various parts in the room. Namely, the characteristic of heat reception quantity ratio also represents a change in the heat reception quantity of parts in the interior room.

As above, the light receiving surfaces respectively of the light receiving elements ar arranged such that the sum of the normal vectors respectively of the surfaces is oriented toward the sunshine direction maximizing the heat reception quantity. Consequently, the quantity of heat received by the car can be simply attained by adding to each other the outputs from the respective light receiving elements. Moreover, the three sunshine components including the intensity, elevation angle, and azimuth angle can be appropriately obtained from the expressions (10) to (12).

In addition, since the total of outputs from the light receiving elements is employed to decide the heat reception quantity, the heat reception quantity Ts of the interior room can also be attained even when the sunshine illuminated onto the car includes a reduced amount of direct sunshine beams other than the scattered beams.

Moreover, in a sunshine sensor arranged as shown in FIG. 1, there may exist a region in which the expression (10) to (12) does not hold due to the structural condition described in conjunction with FIG. 3; however, the output ratio between the second and third light receiving elements is employed to detect the ration, thereby preventing the wrong operation of the air conditioner.

While particular embodiments of the present invention have been shown and described, it will be obvious to those skilled in the art that various changes and modifications may be made without departing from the present invention in its broader aspects.

What is claimed is:

1. A sunshine sensor for use with a car comprising:
    a first light receiving element having a light receiving surface facing upward;
    a second light receiving element and a third light receiving element which each have a light receiving surface inclined toward a front side by an identical angle along an advancing direction of the car, said light receiving surfaces being symmetrically inclined with respect the car advancing direction along a horizontal direction vertical to the car advancing direction; and
    adder means for adding to each other outputs respectively produced from said light receiving elements, each of said light receiving surfaces respectively of said second and third light receiving elements having an inclination angle such that a vector obtained by adding normal vectors respectively of said light receiving surfaces of said respective light receiving elements has a direction substantially identical to a direction of sunshine which maximizes a quantity of heat supplied from the sunshine to the car.

2. A sunshine sensor according to claim 1 further including:
- a base plate having a horizontal surface in a top end portion thereof and a pair of inclined surfaces which are inclined toward a front side by an identical angle along the car advancing direction and which are symmetrically inclined with respect to the car advancing direction along a horizontal direction vertical to the car advancing direction by said identical angle, said flat surface and said inclined surfaces being disposed for arranging thereon said first, second, and third light receiving elements, respectively; and
- a cover having a hemispherical contour and passing therethrough the sunshine.

3. A sunshine sensor according to claim 1 wherein said sunshine sensor is installed on a dashboard of the car.

4. A sunshine sensor according to claim 2 wherein said sunshine sensor is installed on a dashboard of the car.

5. A sunshine sensor for use with a car comprising:
- a first light receiving element facing upward and producing an output ic;
- a second light receiving element generating an output ia and a third light receiving element creating an output ib, each of said second and third light receiving elements having a light receiving surface inclined toward a front side by an identical angle along an advancing direction of the car, said light receiving surfaces being symmetrically inclined with respect the car advancing direction along a horizontal direction vertical to the car advancing direction; and
- computating means for computing based on the outputs respectively from said first, second, and third light receiving elements a relative sunshine intensity I, a sunshine elevation angle $\theta$, and a sunshine azimuth angle $\phi$,
- said computing means computing the sunshine intensity I, the sunshine elevation angle $\theta$, and the sunshine azimuth angle $\phi$ based on the following equations.

$$\theta = \cos^{-1}\sqrt{\frac{(ia - ib)^2 + (ia + ib - 1.07ic)^2}{1.426ic^2 + (ia - ib)^2 + (ia + ib - 1.07ic)^2}}$$

$$I = ic/\sin\theta$$

$$\phi = \cos^{-1}\left(\frac{ia + ib - 1.07ic}{1.194ic \cdot \cos\theta/\sin\theta}\right)$$

6. An air conditioner for use with a car comprising:
- a sunshine sensor including
- a first light receiving element facing upward, and
- a second light receiving element and a third light receiving element which each are inclined toward a front side by an identical angle along an advancing direction of the car and which are symmetrically inclined with respect the car advancing direction along a horizontal direction vertical to the car advancing direction,
- each of said second and third light receiving elements having a light receiving surface possessing an inclination angle such that a vector obtained by adding to each other normal vectors respectively of said light receiving surfaces of said respective light receiving elements has a direction substantially identical to a direction of sunshine which maximizes a quantity of heat supplied from the sunshine to the car;
- air conditioning means for regulating a temperature and an amount of air to be supplied to an interior room of the car; and
- a control means for computing sunshine components from outputs respectively created from said first, second, and third light receiving elements and controlling said air conditioning means based on a result of the computation.

7. An air conditioner according to claim 6 wherein said air conditioning means includes:
- blower means for supplying an air to the room;
- cooler means for cooling an air;
- heater means for heating an air;
- at least two air blow-off exits; and
- air flow quantity ratio adjusting means for adjusting a ratio between air flow quantities from said at least two air blow-off exits,
- said control means controlling said air flow quantity ratio adjusting means depending on the sunshine components thus computed, thereby regulating the air low quantity ratio between said blow-off exits.

8. A method of controlling an air conditioner for use with a car comprising the following steps of:
- obtaining an output ic generated from a first light receiving element facing upward, an output ia produced from a second light receiving element, and an output ib generated from a third light receiving element, each of said second and third light receiving elements being inclined toward a front side by an identical angle along an advancing direction of the car, said second and third light receiving elements being symmetrically inclined with respect the car advancing direction along a horizontal direction vertical to the car advancing direction;
- computing based on the outputs respectively from said first, second, and third light receiving elements a sunshine intensity I, a sunshine elevation angle $\theta$, and a sunshine azimuth angle $\phi$ based on the following equations;

$$\theta = \cos^{-1}\sqrt{\frac{(ia - ib)^2 + (ia + ib - 1.07ic)^2}{1.426ic^2 + (ia - ib)^2 + (ia + ib - 1.07ic)^2}}$$

$$I = ic/\sin\theta$$

$$\phi = \cos^{-1}\left(\frac{ia + ib - 1.07ic}{1.194ic \cdot \cos\theta/\sin\theta}\right)$$

- computing a control target value of the air conditioner depending on the computed values respectively of the relative sunshine intensity I, the sunshine elevation angle $\theta$, and the sunshine azimuth angle $\phi$; and
- controlling the air conditioner depending on the control target value.

9. A control method according to claim 8 wherein said step of computing the relative sunshine intensity I, the sunshine elevation angle $\theta$, and the sunshine azimuth angle $\phi$ further comprising the steps of:
- computing differences between the outputs respectively produced from said light receiving elements;

comparing the attained output differences with predetermined values;

computing, when the output differences exceed the predetermined values, the relative sunshine intensity I, the sunshine elevation angle $\theta$, and the sunshine azimuth angle $\phi$ based on the outputs respectively from said first, second, and third light receiving elements by use of the expressions; and setting, when the output differences are less than the predetermined values, values respectively preset as the relative sunshine intensity I, the sunshine elevation angle $\theta$, and the sunshine azimuth angle $\phi$ to the relative sunshine intensity I, the sunshine elevation angle $\theta$, and the sunshine azimuth angle $\phi$, respectively.

10. A control method according to claim 8 wherein said step of computing the relative sunshine intensity I, the sunshine elevation angle $\theta$, and the sunshine azimuth angle $\phi$ further comprising the steps of:

comparing a ratio between the outputs respectively from said second and third light receiving elements with a predetermined value;

computing, when the output ratio exceeds the predetermined value, the relative sunshine intensity I, the sunshine elevation angle $\theta$, and the sunshine azimuth angle $\phi$ based on the outputs respectively from said first, second, and third light receiving elements by use of the equations; and setting, when the output ratio is less than the predetermined value, values previously obtained respectively as the relative sunshine intensity I, the sunshine elevation angle $\theta$, and the sunshine azimuth angle $\phi$ to the relative sunshine intensity I, the sunshine elevation angle $\theta$, and the sunshine azimuth angle $\phi$, respectively.

11. A control method according to claim 8 wherein said step of computing the relative sunshine intensity I, the sunshine elevation angle $\theta$, and the sunshine azimuth angle $\phi$ further comprising a step of computing a quantity of heat received by the car based on the obtained relative sunshine intensity I.

* * * * *